US008717979B2

(12) United States Patent
Tsai et al.

(10) Patent No.: US 8,717,979 B2
(45) Date of Patent: May 6, 2014

(54) MULTIPLEXING MULTIPLE UNSOLICITED GRANT SERVICE (UGS) USERS ONTO A SAME RADIO RESOURCE

(75) Inventors: Shiau-He Shawn Tsai, Stockholm (SE); Jonas L. Wiorek, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1267 days.

(21) Appl. No.: 12/053,323

(22) Filed: Mar. 21, 2008

(65) Prior Publication Data

US 2009/0109907 A1    Apr. 30, 2009

Related U.S. Application Data

(60) Provisional application No. 60/996,011, filed on Oct. 25, 2007.

(51) Int. Cl.
*H04W 4/00* (2009.01)
*H04J 3/00* (2006.01)
*H04J 3/16* (2006.01)
*H04B 7/212* (2006.01)

(52) U.S. Cl.
USPC ............ 370/329; 370/345; 370/347; 370/346

(58) Field of Classification Search
USPC .......................................................... 370/329
See application file for complete search history.

(56) References Cited

U.S. PATENT DOCUMENTS

| | | | |
|---|---|---|---|
| 6,870,825 B1* | 3/2005 | Huang et al. | 370/342 |
| 2005/0063330 A1 | 3/2005 | Lee et al. | |
| 2005/0063336 A1 | 3/2005 | Kim et al. | |
| 2005/0286408 A1* | 12/2005 | Jin et al. | 370/208 |
| 2007/0206561 A1* | 9/2007 | Son et al. | 370/346 |
| 2008/0090583 A1* | 4/2008 | Wang et al. | 455/452.1 |

FOREIGN PATENT DOCUMENTS

| | | |
|---|---|---|
| EP | 0600713 A2 | 6/1994 |
| EP | 1631104 A1 | 3/2006 |
| EP | 1761080 A1 | 3/2007 |
| JP | 6318927 | 11/1994 |
| JP | 2007151146 | 6/2007 |
| WO | WO2006/085732 A1 | 8/2006 |

OTHER PUBLICATIONS

International Preliminary Report on Patentability for International Application No. PCT/SE2008/050329 mailed Mar. 1, 2010.

(Continued)

*Primary Examiner* — Noel Beharry
(74) *Attorney, Agent, or Firm* — Nixon & Vanderhye P.C.

(57) ABSTRACT

The technology in this application multiplexes transmission associated with multiple users onto the same unsolicited grant service (UGS) radio resource(s) in a packet-based, radio communications system. Normally, the radio resources in a packet-based communications system are dynamically scheduled in response to radio resource requests associated with specific user devices, and the scheduled communications are designed not to use the same radio resource at the same time. However, an unsolicited grant of radio resources for communication between multiple user devices and the packet-based communications system is also established. The communications between those multiple user devices and the packet-based communications system use at least some of the same radio resources associated with the unsolicited grant at the same time. Because of this at least partial radio resource overlap/collision, each of the multiple user's data to be transmitted via the UGS is associated with a user-specific radio resource pattern. A user's radio resource pattern permits a radio receiver to extract that user's data from the received UGS signal that include multiple user transmissions.

36 Claims, 6 Drawing Sheets

- 12 freq-time grids per tile
- Length-12 orthogonal channelization code creates 12 code channels
- CDM pilot and data channels for a user (56) References Cited

OTHER PUBLICATIONS

Written Opinion and International Search Report in corresponding PCT application No. PCT/SE2008/050329, Feb. 25, 2009.
Tsai et al., "Multiple-User Unsolicited Grant Service (UGS) Slot," IEEE C802.16m-07/261r2, http://ieee802.org/16, Jan. 21, 2008, pp. 1-4.
Part 16: Air Interface for Fixed Broadband Wireless Access Systems, IEEE Std 80216™-2004, pp. 1-895.
Part 16: Air Interface for Fixed Broadband Wireless Access Systems, IEEE Std. 802.16f™-2005, pp. 1-257.
3GPP2 C.S0024 Version 3.0, cdma2000 High Rate Packet Data Air Interface Specification, Dec. 5, 2001, pp. 1-593.
3GPP TS 25.214 V5.11.0 (Jun. 2005) pp. 1-51.
3GPP TS 25.212 V5.10.0 (Jun. 2005), pp. 1-72.
3GPP TS 26.071 V6.0.0 (Dec. 2004), pp. 1-12.
English summary of Japanese official action mailed Aug. 7, 2012 in Japanese Application No. JP2010-530957.
European Communication dated Nov. 4, 2013 and Supplementary European Search Report in European Application No. EP 08 72 4276.
Tara Ali-Yahiya et al., "Service Flows Aware Radio Resource Allocation in IEEE 802.16e Networks", Mobile Wireless Communications Networks, 2007 9th IFIP International Conference on IEEE, Sep. 19, 2007, pp. 61-65, XP031359254.
Antonio Lera et al., "Channel-Aware Scheduling for QoS and Fairness Provisioning in IEEE 802.16/WiMAX Broadband Wireless Access Systems", IEEE Network, IEEE Service Center, vol. 21, No. 5, Sep. 1, 2007, pp. 34-41, XP011192383.

* cited by examiner

MULTIPLEXING MULTIPLE UNSOLICITED GRANT SERVICE (UGS) USERS ONTO A SAME RADIO RESOURCE

PRIORITY APPLICATION

Priority is claimed from U.S. provisional patent application Ser. No. 60/996,011, filed on Oct. 25, 2007, the disclosure of which is incorporated herein by reference.

TECHNICAL FIELD

The technical field relates to radio communications, and in particular, to a radio communications network including a base station and multiple wireless subscriber stations that communicate using non-collision-based scheduling of users for access to common packet-based radio resources.

BACKGROUND

In a typical radio communications system, user communications terminals referred to as user equipment units (UEs) communicate via a radio access network (RAN) with other networks like the Internet. The radio access network (RAN) covers a geographical area which is divided into cell areas, with each cell area being served by a base station, e.g., a radio base station (RBS), which in some networks is also called a "NodeB" or enhanced Node B. A cell is a geographical area where radio coverage is provided by the radio base station equipment at a base station site.

Third Generation (3G) cellular radio systems like Universal Mobile Telecommunications System (UMTS) operating in Wideband Code Division Multiple Access (WCDMA) use different types of radio channels including unscheduled radio channels and scheduled radio channels. Mixed voice/data, circuit/packet switched 3G systems evolved from voice-centric, circuit-switched second generation (2G) systems. Unscheduled channels, sometimes called dedicated channels, are usually allocated to only one user for the duration of a connection carrying information only associated with that one user. Scheduled channels are packet-switched channels over which packets for multiple user connections are carried. Fourth generation (4G) systems, like the Long Term Evolution (LTE) of UMTS and Worldwide Interoperability for Microwave Access (WiMAX), design the air interface based on packet data. Dedicated traffic channels are eliminated in favor of scheduled radio channels in order to simplify the system. Medium access control is thus migrating towards a request resource-grant resource paradigm. In response to actual requests to transmit data from and/or to a user equipment (UE) in the uplink and/or the downlink, the scheduler in the base station dynamically allocates radio resources to satisfy the quality of service requirements associated with the type of data traffic to be transmitted, and at the same time, tries to optimize the system capacity.

The IEEE 802.16 Working Group on Broadband Wireless Access Standards develops formal specifications for the global deployment of broadband Wireless Metropolitan Area Networks (MAN). Although the 802.16 family of standards is officially called WirelessMAN, it is often referred to as WiMAX. In general, 802.16 standardizes two aspects of the air interface: the physical layer (PHY) and the Media Access Control layer (MAC). For the physical layer, one mode of IEEE 802.16e uses scalable orthogonal frequency division multiple access (OFDMA) to support channel bandwidths of between 1.25 MHz and 20 MHz with up to 2048 sub-carriers. IEEE 802.16e supports adaptive modulation and coding, so that in good radio signal conditions, a highly efficient 64 QAM coding scheme can be used, whereas in poor radio signal conditions, a more robust BPSK coding mechanism can be used. In intermediate conditions, 16 QAM and QPSK can be employed. Other physical layer features include support for multiple-in-multiple-out (MIMO) antennas in order to provide good NLOS (Non-line-of-sight) characteristics (or higher bandwidth) and Hybrid automatic repeat request (HARQ) for good error correction performance.

In terms of Media Access Control (MAC), IEEE 802.16e encompasses a number of convergence sublayers which describe how wireline technologies such as Ethernet, ATM and IP are encapsulated on the air interface, and how data is classified, etc. It also describes how secure communications are delivered, by using secure key exchange during authentication, and encryption during data transfer. Further features of the MAC layer include power saving mechanisms (using Sleep Mode and Idle Mode) and handover mechanisms.

The 802.16 WiMAX protocol supports five types of quality of service (QoS): UGS (Unsolicited grant service), rtPS (Real time polling Service), ertPS (Extended Real-time POLLING SERVICE), nrtPS (Non-real-time polling service), and BE (Best effort service). The Unsolicited Grant Service (UGS) is designed to support real-time service flows that generate fixed-size data packets on a periodic basis, such as T1/E1 and Voice-over-IP (VoIP) without silence suppression. UGS offers fixed-size, unsolicited radio resource grants (meaning the UE does not have to request a grant of radio resources before each transmission) on a real-time periodic basis, which eliminates the overhead and latency associated with UE grant requests and assures that grants are available to meet the data flow's real-time needs. Another term associated with UGS is semi-persistent scheduling of radio resources.

The unsolicited grants are allocated by the scheduler in the base station. UEs compete once for initial entry into the network, and thereafter, each assigned UE is allocated a UGS access slot by the base station scheduler. The granted UGS time slot can enlarge and contract, but it remains assigned to the UE for the duration of the UGS, which normally means that other UEs cannot use it.

But there are drawbacks with the UGS. The UGS consumes the radio resources in the same way as fixed, pre-assigned slots in TDMA systems such as GSM, regardless of whether the user is sending or receiving data over the UGS resource. For example, the UGS does not take advantage of the stochastic behavior, low data rate, and error tolerance of voice. Voice can be modeled as a stochastic process that has certain characteristics. Some vocoders generate null-rate frames during silence periods that can be omitted from transmission, therefore creating idle UGS slots over the air. Some vocoders generate full-, half-, quarter- and eighth-rate frames. Lower vocoder rates have lower power requirements and higher error rate tolerance, which makes bandwidth and power allocated in UGS slots more than what can be and actually is used. Other types of traffic may have similar characteristics, e.g., motion pictures with occasional still-image scenes.

One way to improve radio resource efficiency in facilitating services that use an UGS is to pack multiple users' low-rate packets (small payloads) into one big packet. This multi-user packet approach avoids allocating excessive bandwidth or power to a single low-rate user by aggregating small payloads into a large packet to fully utilize the available resources. But there are drawbacks with multi-user packets. First, multi-user packets are not used in the uplink. Second, extra constraints are imposed on scheduling when multi-user packets are transmitted on the downlink. The scheduler needs to maximize the usage of power and bandwidth and at the same time satisfy the delay constraint of each traffic flow, which introduces uncertainty in the formatting of multi-user packets. As a result of the format uncertainty, multi-user packets require more signaling overhead to indicate payload combinations, modulation, and coding schemes. Third, on the receiver side, blind detection may be necessary if payload combinations are compressed to reduce overhead. Compressed overhead adds extra hypotheses and hence degrades detection performance. Fourth, a multi-user packet complicates HARQ operations. Different user receivers may have different success in decoding a multi-user packet creating a dilemma in retransmission policy. If the same packet is retransmitted with less format signaling overhead, radio resources will be wasted on payloads that have been successfully received. If a different packet is retransmitted to avoid redundancy, the operations in the scheduler are more complex and more overhead for signaling the packet format is required.

Another approach that might improve radio resource efficiency in facilitating UGS communications is to use extended real-time polling where there is a period for silence suppression so that the uplink radio resources normally set aside for uplink transmission requests can be scheduled for data payload transmission. But extended real-time polling still requires uplink requests and downlink scheduling grants during the non-idle state where the traffic flow is nearly constant. Sending request and grant messages when the traffic flow is nearly constant, as it often is for voice traffic, is a waste of radio resources. During silence periods, some vocoders still transmit null frames to maintain the state machine at the receiver decoders. The null frames may be sent on the order of every hundred milliseconds, creating ambiguities for restarting polling. These low-rate null frames may keep the extended real-time polling largely in the "costly" request-grant operation. But not all vocoders support silence suppression. Some voice applications, such as SKYPE, generate continuous traffic. In those applications, the extended real-time polling reduces to real-time polling, where request and grant messages with the regular MAC overhead are constantly sent even though they are not necessary.

Consequently, an UGS envisioned for a request resource-grant resource-based packet radio communications system does not efficiently use radio resources for stochastic-type traffic that is non-deterministic in its activity, low-rate, low-delay, and error-tolerant.

SUMMARY

Normally, radio resources in a packet-based communications system are dynamically scheduled in response to radio resource requests associated with specific user devices to permit communications between those user devices and the packet-based communications system. The scheduled communications associated with each of the user devices in the packet-based communications system are designed not to use the same radio resource(s) at the same time. In other words, the packet-based communications system is designed so that transmissions associated with specific user devices normally do not collide or overlap. In contrast, the technology in this application multiplexes multiple users onto a same radio resource for a packet-based, radio communications system that offers an unsolicited grant service (UGS).

An unsolicited grant of radio resources for communication between multiple user devices and the packet-based communications system is established. The UGS gives the multiple users access to radio resources without an explicit request from each of the multiple user devices for each transmission using the UGS radio resources. The communication between multiple user devices and the packet-based communications system uses at least some of the same radio resources associated with the unsolicited grant at the same time. Each of the multiple user's data to be transmitted via the UGS is processed to associate each of the multiple user's data with a user-specific radio resource pattern. The radio resource pattern associated with one user device permits a radio receiver to extract that user's data transmission from the multiple user data transmissions received using the same unsolicited grant of radio resource(s) at the same time. The processed data is then transmitted from each of the multiple user devices using the same unsolicited grant of radio resources at the same time.

In one non-limiting example, the allocated unsolicited grant of radio resources includes frequency and/or time resources. For example, the packet-based communications system may employ orthogonal frequency division multiple access (OFDMA) so that the allocated unsolicited grant of radio resources includes frequency (sub-carriers) and time resources. Examples of such a packet-based communications system is an LTE-based system, a WiMAX-based system, or any OFDMA-based system.

Examples of user-specific radio resource patterns include multiplexing codes over UGS frequency and time resources which are substantially orthogonal to each other, different frequency-time patterns, and different frequency-time hopping patterns. The multiplexing codes may spread or not spread the data being coded. In one example, each user-specific radio resource pattern corresponds to a set of orthogonal channelization codes. Applying the corresponding set of orthogonal channelization codes to each user's data transmission results in Guassian-like interference to the other users.

This UGS technology is particularly well-suited for data communications that include one or more of the following characteristics: a non-deterministic activity factor, delay-sensitive, lower data rate requirements, or tolerance to bit or block errors. Voice is a just one example.

In a non-limiting example embodiment, the UGS radio resource grant includes a UGS time slot, and communications involving multiple user devices are sent during the same UGS time slot. The number of the multiple user devices allocated for the same UGS time slot is preferably determined based on an interference threshold, i.e., the number of user devices is limited to keep their mutual interference below the threshold. Due to a fractional activity factor, the UGS slot generally provides a bandwidth larger than required for any one of the multiple user device's data transmissions at each scheduling instance. Accordingly, the processed data from the multiple user devices can be multiplexed onto the UGS slot at the same time so that the multiple user device data transmissions share access to the UGS slot in a stochastic fashion, which is well-suited to traffic with characteristics similar to voice activity.

In some applications, like Voice over IP (VoIP) applications, it may be the case that a first set of user devices are designated to use the radio resources allocated for a UGS slot in a non-overlapping manner. Then, to improve efficiency and increase capacity, a second set of user devices users are also designated to use the radio resources for the UGS slot in a manner that at least partially overlaps the scheduled use by the first set of user devices. The amount of interference caused by the partial overlap of the second set of one or more user devices and experienced by each of the first set of user devices is preferably controlled to keep error rates below a predetermined threshold. In one non-limiting example implementation, the user-specific radio resource patterns are selected to make mutual interference between the first and second sets of user devices approximately Gaussian after receiver processing.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

It will be apparent to one skilled in the art that other embodiments may be practiced apart from the specific details disclosed below. The technology is described in the context of an evolved 3GPP UMTS system referred to as LTE in order to provide an example and non-limiting context for explanation. But this technology may be used in any modern cellular communications system like LTE or WiMAX that is packet-based and schedule-driven.

Figure 1:
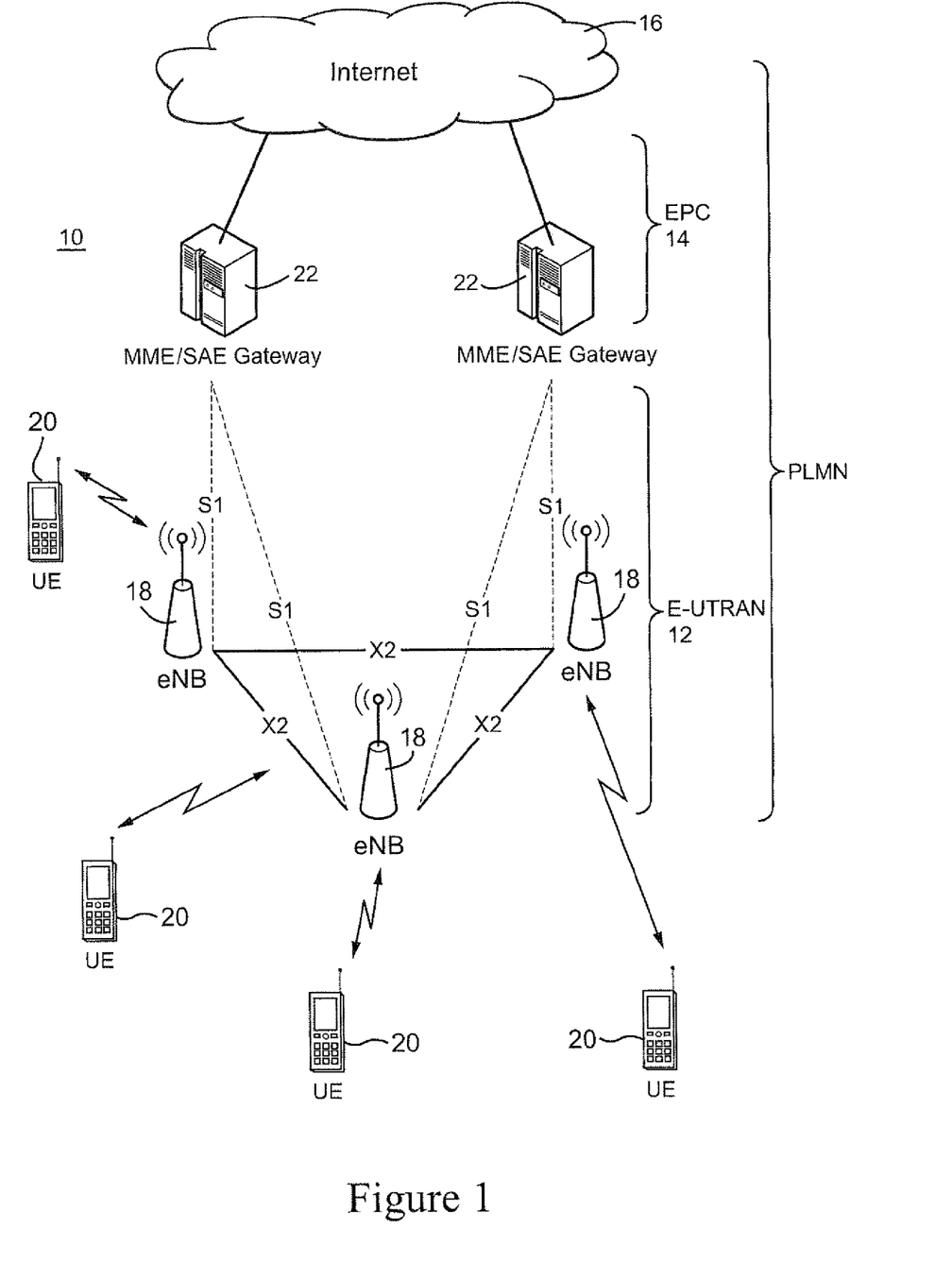
FIG. 1 is a function block diagram of an example LTE mobile radio communication system.

FIG. 1 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. An eNB is sometimes more generally referred to as a base station, and a UE is sometimes referred to as a mobile radio terminal or a mobile station. As shown in FIG. 1, the base stations are interconnected with each other by an X2 interface. The base stations are also connected by an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. The S1 interface supports a many-to-many relation between MMEs/SAE Gateways and eNBs. The L-UTRAN 12 and EPC 14 together form a Public Land Mobile Network (PLMN). The MMEs/SAE Gateways 22 are connected to directly or indirectly to the Internet 16 and to other networks.

As described in the background, to provide efficient resource usage, LTE and other systems that use shared radio resources support fast "dynamic" scheduling where resources on the shared channels are assigned dynamically to user equipment (UE) terminals and radio bearers on a sub-frame basis according to the momentary traffic demand, quality of service (QoS) requirements, and estimated channel quality. This dynamic scheduling task is typically performed by one or more schedulers situated in the eNB.

Figure 2:
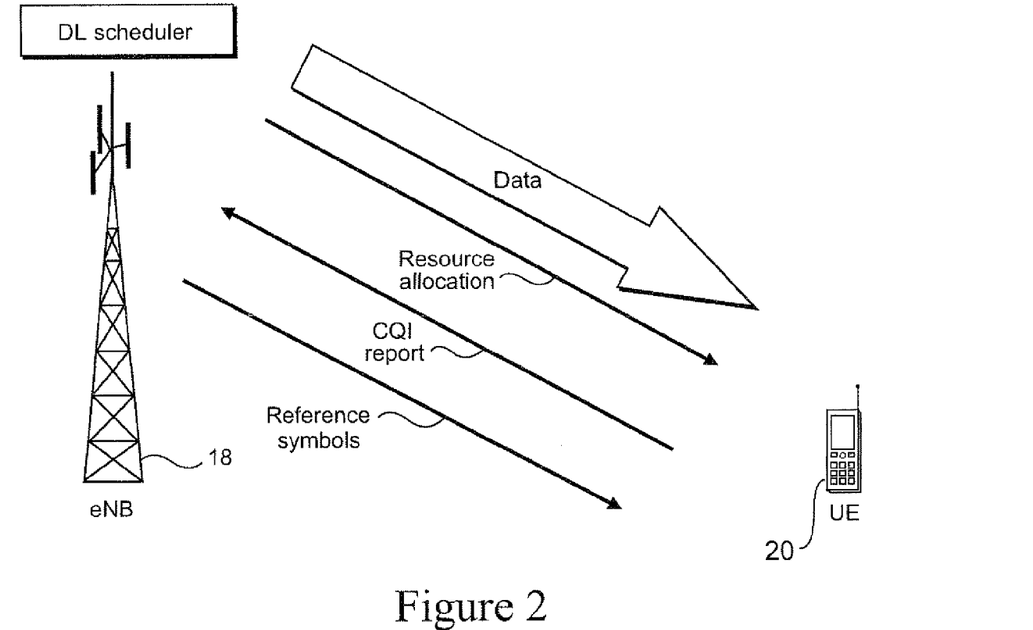
FIG. 2 is a conceptual illustration of downlink scheduling and related operations.

The overall scheduling concept for the downlink is illustrated in FIG. 2. To support fast channel-dependent link adaptation and fast channel-dependent time and frequency domain scheduling, the UE 20 may be configured to report the Channel Quality Indicator (CQI) to aid the eNB 18 in its dynamic scheduling decisions. Typically, the UE 20 bases the CQI reports on measurements on downlink (DL) reference signals. Based on the CQI reports and QoS requirements of the different logical channels, the DL scheduler in the eNB 18 dynamically assigns time and frequency radio resources, i.e., scheduling blocks. The dynamically-scheduled radio resource assignment is signaled on a Physical Downlink Control Channel (PDCCH) in the LTE example. Each UE 20 monitors the control channel to determine if that UE is scheduled on the shared channel (PDSCH in LTE), and if so, what physical layer radio resources to find the data scheduled for downlink transmission.

Figure 3:
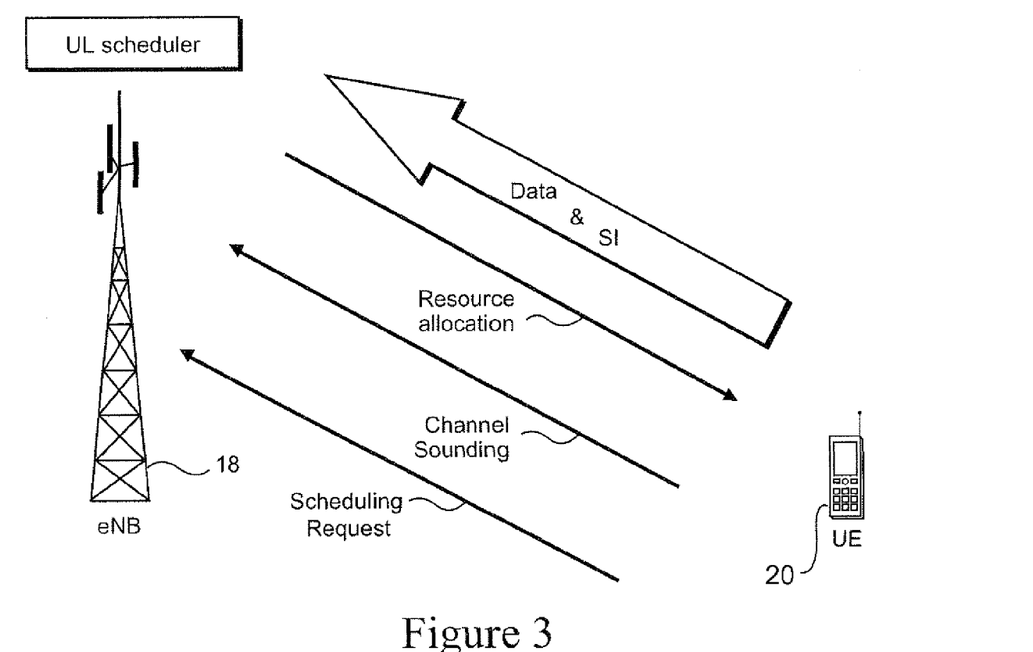
FIG. 3 is a conceptual illustration of uplink scheduling and related operations.

The uplink scheduling concept is illustrated in FIG. 3. The WE 20 informs the UL scheduler in the eNB 18 when data arrives in the transmit buffer with a Scheduling Request (SR). The UL scheduler selects the time/frequency radio resources the UE will use and also selects the transport block size, modulation, and coding because link adaptation for the uplink is performed in the eNB. The selected transport format is signaled together with information on the user ID to the UE. This means that the UE must use a certain transport format and that the eNB is already aware of the transmission parameters when detecting the UL data transmission from that UE. The assigned radio resources and transmission parameters are sent to the UE via the PDCCH in LTE. Later, additional Scheduling Information (SI) such as a Buffer Status Report (BSR) or a power headroom report may be transmitted together with data.

Although dynamic scheduling is the baseline for LTE and other systems, it can be less than optimum for certain types of services. As explained in the background, for services such as speech (VoIP) where small packets are generated regularly, dynamic scheduling results in substantial control signaling demands because a grant needs to be signaled in each scheduling instance, which in the case of VoIP is a grant must be signaled for every VoIP packet. To avoid this high signaling overhead for these types of services, resources may be assigned semi-statically, which is called "semi-persistent" scheduling. A semi-persistent grant is only signaled once and is then available for the UE at regular periodic intervals without further grant signaling. This process is associated with an unsolicited grant service (UGS).

Voice and other types of media can be characterized as stochastic. A stochastic process is one whose behavior is "non-deterministic" in that a current state does not fully determine its next state. There are elements of conjecture and randomness in a stochastic process. Multiplexing is a technique where two or more independent information-bearing signals or data flows are carried by a single common medium or channel. Regularly-scheduled slots and "deterministic"

multiplexing such as is used in time division multiple access (TDMA) are very often not used to full capacity for stochastic data like voice, and thus, are inefficient for this kind of data. The inventors discovered that significant benefits could be achieved by introducing stochastic multiplexing of users onto unsolicited grant service-based resources for certain types of data, such as voice, that is delay-sensitive, error-tolerant, and/or lower-rate. For ease of description, the term voice-type data is used below and encompasses any type of data that is delay-sensitive, error-tolerant, and/or lower-data rate. Stochastic multiplexing means that data associated with multiple users are multiplexed into the same signal space based on their statistical resource requirements after taking their activity factor and QoS requirements into consideration. When one or more users is temporarily inactive (no data transmission), they cease to generate interference, and radio resources are released to those active users that are multiplexed into the same signal space. The non-deterministic change of interference level introduces a stochastic characteristic to the proposed multiplexing scheme.

The technology in this case creates a semi-persistent channel in a data-oriented system like the orthogonal frequency division multiple access (OFDMA) type systems that have become popular today. A semi-persistent channel is created using an unsolicited grant service (UGS) that does not require explicit grant requests to acquire radio resources to support the data traffic and then multiplexing multiple voice users for transmission using the same (or at least some of the same) UGS resources.

After a UGS slot is allocated to multiple user devices, they are multiplexed in that slot along with or using user-specific radio resource patterns so that they share access to these UGS slots preferably in a spontaneous and stochastic fashion. Also preferably, multiple UGS users are allocated in a common UGS slot that provides a bandwidth larger than required for any one of the user's service flows. Different direct sequence spreading codes, channelization codes, frequency patterns, pseudo random tone hopping patterns, or a combination of two or more of the above are examples of user radio resource patterns.

For spread spectrum in an OFDMA system example, each UGS region includes multiple tones over a period of multiple OFDM symbols. The modulated OFDM symbols of each user are spread by the user's corresponding user-specific spreading code. The user-specific spreading codes are preferably mutually orthogonal but some cross-correlation may be allowed. For tone hopping, in each UGS region, each user only occupies a small portion of available OFDM frequency-time grids or tiles. The pattern of occupied OFDM grids is preferably unique to each user and may change from time to time. Hopping patterns preferably should have a small probability of collision or no overlap between different users in the UGS slots. Another approach could include a hybrid of direct-sequence-spreading and tone hopping. User signals may occupy only a portion of the assigned UGS region with a specific grid pattern. Each user's signal is distinguished from the other user signals occupying the same set of OFDM grids/tiles by its associated unique user-specific radio resource pattern.

When orthogonal direct sequence spreading is used, it may be desirable to modulate the data symbols within a coherent block of frequency-time grids/tiles such that the orthogonality is maintained in the fading environment. In the tone hopping case, orthogonality is preserved as long as there is no collision with another user's hopping pattern. Although not required, it is preferable that uplink transmissions from multiple access UEs be power controlled and/or rate controlled.

The power control rate can be fixed or flexible. If a distributed subcarrier allocation is used, the power and rate control rates can be slower due to frequency diversity. If contiguous subcarrier allocation is used, the power and rate control rates can be faster to compensate time selective fading. The selection of a user-specific radio resource pattern multiple access scheme may depend on subcarrier allocation as well.

The UGS slot is effectively accessed/used by user devices based on their respective activity factor. For voice traffic, a non-deterministic activity factor, optionally combined with power and rate control, results in capacity gain that is evident from the experience of conventional CDMA systems.

Usually, an UGS slot is granted to UEs periodically. For low-rate UGS users, it would be preferable not to send modulation and coding format information for each data packet because the overhead is disproportionate to the payload. Thus, modulation and coding are preferentially specified at the LOS allocation setup, and thereby, eliminating the need for them to be signaled each time. To further reduce overhead, a simplified UGS map applicable to all UGS bursts within a given time duration may be specified such that no modulation and coding format needs to be updated. In addition, a specific payload format can be defined for the UGS flow so the payload does not need to conform to the generic MAC header format.

Figure 4:
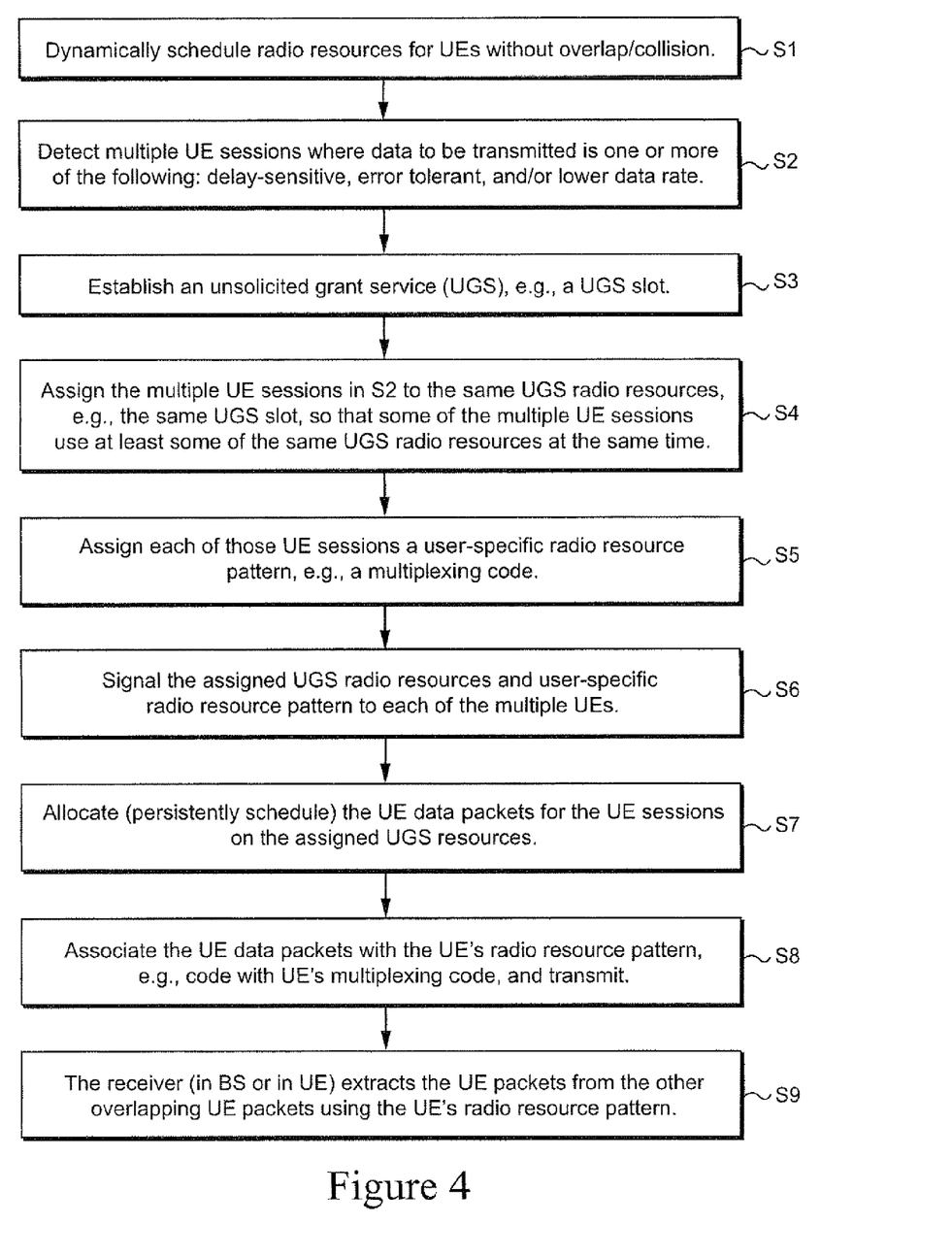
FIG. 4 is a flow chart diagram illustrating non-limiting, example procedures for multiplexing multiple users onto a same radio resource for an unsolicited grant service.

FIG. 4 is a flow chart diagram illustrating non-limiting, example procedures for multiplexing multiple user packet data streams onto the same radio resources designated for an unsolicited grant service (UGS). The packet radio communication system is designed to normally dynamically schedule radio resources for communications involving UEs without overlapping or colliding (step S1). But as explained above, there are situations and certain types of data where it may be more efficient and appropriate for there to be some overlap/collision. Multiple UE sessions are detected where data to be transmitted has one or more of the following characteristics: delay-sensitive, error tolerant, and/or lower data rate (step S2). An unsolicited grant service is established, e.g., a UGS slot (step S3). The multiple UE sessions are assigned in step S2 to the same UGS radio resources, e.g., the same UGS slot, so that some of the multiple UE sessions use at least some of the same UGS radio resources at the same time (step S4). Each of those UE sessions is assigned a user-specific radio resource pattern, e.g., a multiplexing code (step S5). The assigned UGS radio resources and user-specific user-specific radio resource patterns are signaled to each of the multiple UEs (step S6). The UE data packets for the UE session are allocated (persistently scheduled) on the assigned UGS resources (step S7). The UE data packets are associated with the UE's radio resource pattern, e.g., coded with the UE's multiplexing code, and transmit (step S9). The receiver either in the base station or in the UE) extracts the UE packets from the other overlapping packets received using the UE's radio resource pattern (step S9). Preferably, steps S1-S8 are performed in the base station.

This stochastic multiplexing of UGS slots is designed for short-delay, fixed block-error rate, and/or fixed data rate traffic where fast modulation and coding scheme (MCS) adaptation may not be needed. Setting up a user's transmissions in multiple-access UGS slots may be done in a way that is similar to setting up a dedicated voice traffic channel in conventional 3G systems. A UGS burst may be assigned with a predefined MCS at the connection setup, and the quality of service is maintained by power and rate control. The MCS can be reconfigured by an in-traffic control message in the UGS slots. Since the multiple-access UGS slots are given to voice-type traffic and the payload formats have a small number of combinations, there is no need to apply the generic MAC PDU overhead, which as one example has a length of 6 bytes in WiMAX, and which is not efficient to send along with the format adjustment messages. A simpler MAC PDU format, such as for example an in-traffic control message, can be defined for stochastic multiplexing of UGS slots.

Figure 5:
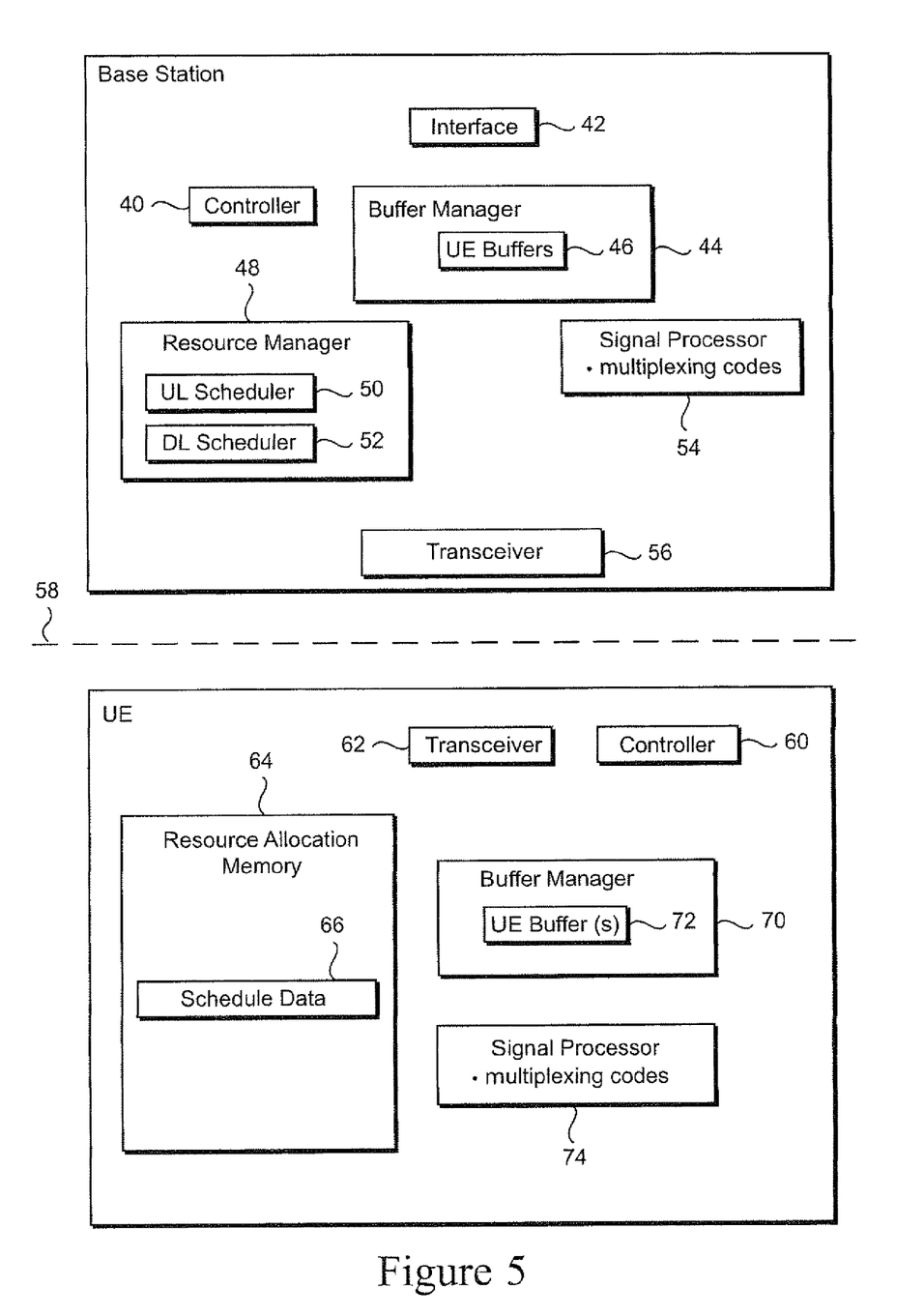
FIG. 5 is a non-limiting, example function block diagram of a base station and a UE that may be used to implement the procedures outlined in FIG. 4.

FIG. 5 is a non-limiting, example function block diagram of a base station and a UE that may be used to implement the procedures outlined in FIG. 4. The base station communicates over a radio interface indicated at the dash line 58 with a UE. The base station includes a controller 40, and interface 42 for connection to one or more other nodes and/or networks, a buffer manager 44 including multiple UE buffers 46, a resource manager 48 including uplink scheduler 50 and downlink scheduler 52, a signal processor 54 having access to user-specific multiplexing codes (e.g., channelization or spreading codes) or other user-specific radio resource patterns, and a transceiver 56. The controller 40 is responsible for the overall operation of the base station.

The buffer manager 44 includes logic for directing user data into and out of an appropriate queue or buffer 46. Each of the buffers 46 is associated with a respective radio connection to a UE and stores user data destined for transmission on the downlink over the air interface 56 to the respective UE. Data from the UE buffers is assembled into a transmission data unit and provided to the transceiver 56 for transmission using an appropriate radio resource to the appropriate UE. Those radio resources are managed by the radio resource manager 46. The transceiver 46 can comprise conventional elements such as suitable encoder(s), amplifier(s), antenna(s), filter(s), conversion circuitry, etc. The uplink scheduler 50 is responsible for providing dynamic radio resource grants to the various UEs that need to transmit data units in the uplink to the base station. The downlink scheduler 52 is responsible for scheduling dynamic radio resource grants from the base station to the various UEs as well as establishing semi-persistent radio resource allocations where appropriate, e.g., to support unsolicited grant services such as voice over IP that benefit from semi-persistent resource allocation. The signal processor 54 is responsible for associating a user-specific radio resource pattern with each user's data that is multiplexed onto a UGS resource. In a non-limiting example of spreading codes, the signal processor 54 spreads each user's data with that user's spreading code before multiplexing the spread data from each user in the UGS group onto a UGS resource.

The UE at the bottom of FIG. 5 includes a supervisory controller 70, a radio transceiver 62, a resource allocation memory 64, a buffer manager 70 with one or more UE buffers, and a signal processor 74. The signal processor 74 uses a user-specific multiplexing code to demultiplex data received from the base station on the USG resource in order to extract the data intended for that UE. The UE buffer(s) 70 stores the data units that are to be transmitted via the transceiver 62 using an appropriately-allocated radio resource. The resource allocation memory allocation memory includes scheduling information 66 received from the uplink and downlink schedulers 50 and 52 from the base station.

Figure 6:
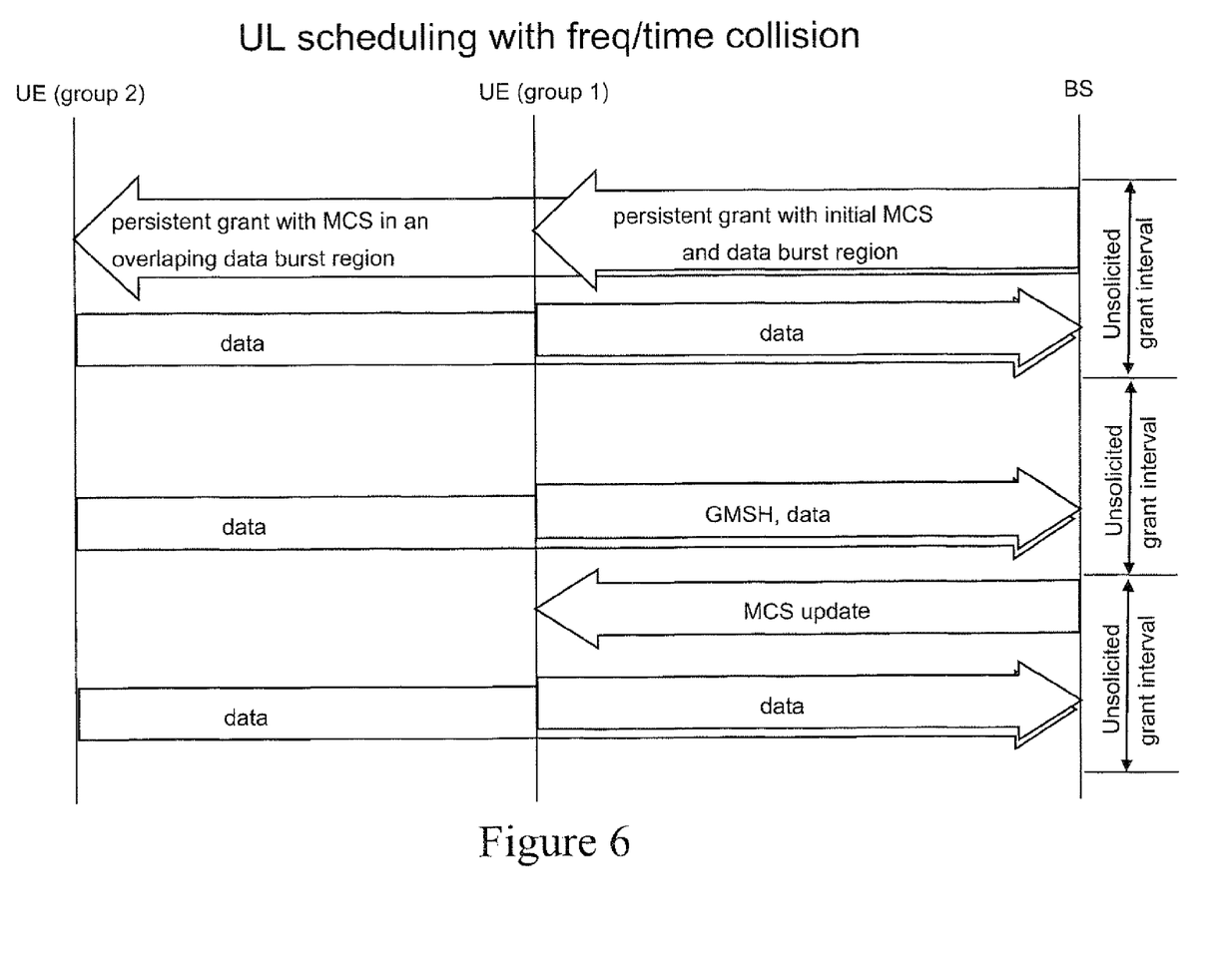
FIG. 6 is a non-limiting, example signaling diagram for uplink scheduling on a UGS slot with frequency and time collision.

FIG. 6 illustrates a non-limiting example signaling diagram for stochastic multiplexing uplink transmissions during a UGS slot. The base station on the right hand side of the figure signals to first and second groups of UE's. The first group of UEs is notified of the persistent grant associated with an unsolicited grant interval assigned to those UEs along with an initial modulation and coding scheme (MCS) as well as a data burst region corresponding to the frequency-time block occupied in a frame. The UEs from group 1 then transmit their data during the designated unsolicited grant interval. In this example, the UEs in the first group are allocated different subcarrier frequencies to transmit their respective data packets in the uplink direction so there is no collision with the data packet transmissions from the other UEs in group 1. As described earlier, because the UEs in group 1 are transmitting voice packets or packets with similar voice-type characteristics, the radio resources associated with the unsolicited grant interval are not fully utilized. As a result, UEs from a second group that also need to transmit voice type data are notified of the same unsolicited grant interval. Each of the UEs in groups 1 and 2 is assigned a user-specific radio resource pattern which is associated with each of the UEs transmitted data packets. Consequently, the UEs from group 2 can transmit data packets that at least partially overlap the same subcarriers that are being used by UEs from group 1 to transmit their data packets. The number of groups is not hard limited; instead, the interference level sets a soft limit to the number of groups that could be applied at a given instance. These overlapping uplink data transmissions from both UE groups continue during each regularly-scheduled unsolicited grant interval as indicated by the second arrow in the middle of the page. The grant management subheader (GMSH) particularly associated with WiMAX is a message field that indicates an uplink bandwidth request along with a regular packet. In the third unsolicited grant interval, a modulation coding scheme modification is transmitted to the first group of UEs in accordance with current radio channel conditions. The UE of group 2 is expected to be signaled by a new, simplified set-up grant and rate adaptation signaling that can be different from those used by group 1.

Figure 7:
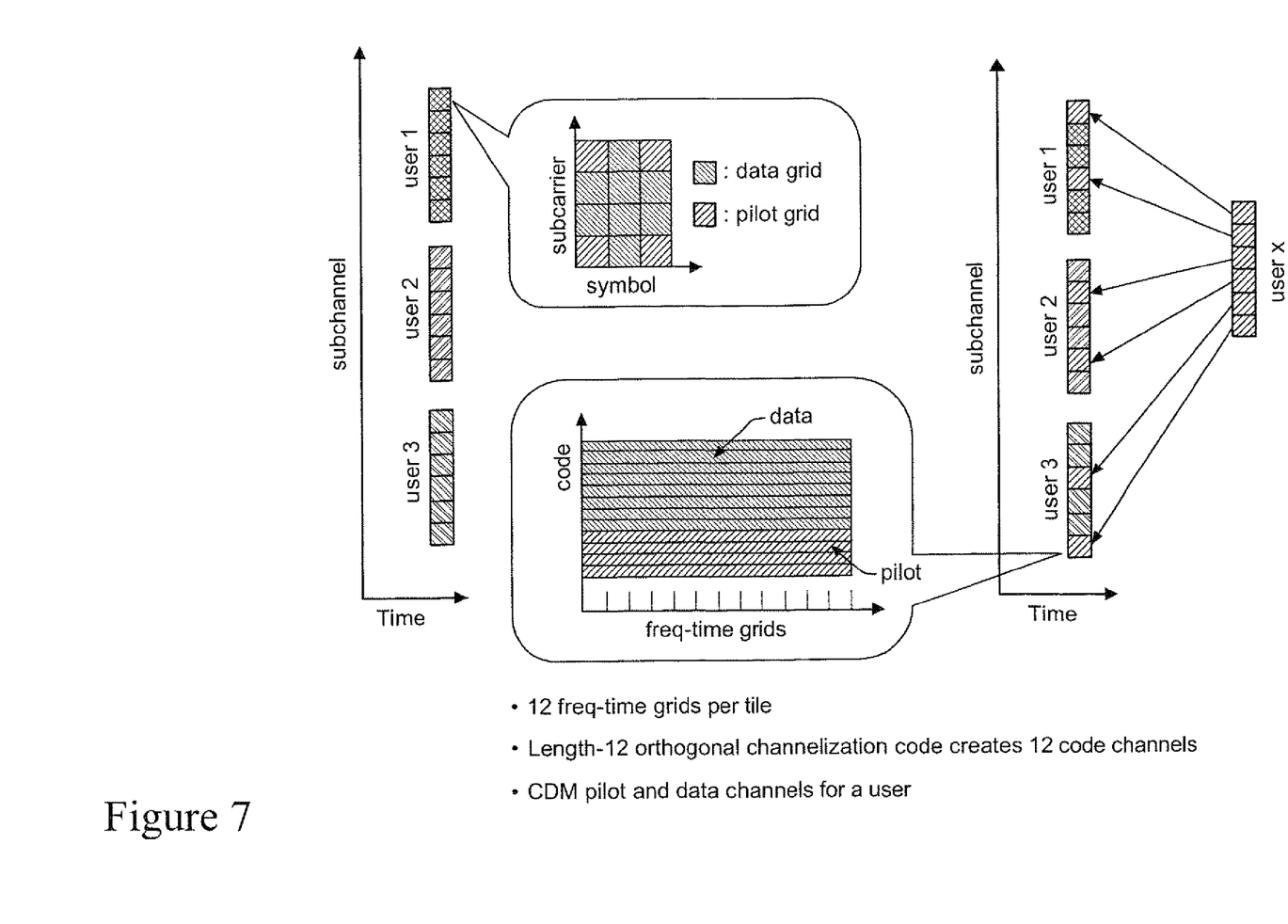
FIG. 7 is a non-limiting, example illustration of multiple users being allocated with partially overlapping frequency and time resources of UGS slots.

FIG. 7 is a non-limiting, example illustration of multiple UEs being allocated with partially overlapping frequency and time resources for UGS slots over the radio channel. In FIG. 7, users 1 through 3 are allocated by the UGS scheduling mechanism. After the number of UGS users reaches a certain number, there will be an increasing number of UGS slots under-utilized because of a relatively low activity factor. As an example, if adding a fourth user, x, to collide equally with the first three users does not increase the error rates beyond a specific voice outage criterion, e.g., a 2% block error rate, then user x in FIG. 7 can use two radio resource tiles from each of the first three users' subchannel to form a subchannel for UL transmission. The interference from user x's transmission can be made Gaussian-like using orthogonal multiplexing codes, as also illustrated in FIG. 7. In this example, the orthogonal multiplexing codes are not spreading codes (but they could be), but rather are channelization codes. The radio resource tile signal locations in the two call-out boxes in the Figure occupy the same frequency and time resources. The 12 frequency-time "grids" provided by a radio resource tile can be used to create a set of length-12 orthogonal channelization codes. Each of user x's 8 data symbols can modulate one code channel and then be combined with pilot code channels to form a code division-multiplexed signal. For the first 3 users, each symbol in the tile will experience interference from user x as a result of the sum of the set of orthogonal codes, which has a Gaussian-like statistical distribution. Likewise, the interference from the first 3 users to each code channel of user x is averaged by the orthogonal channelization coding, which is also randomized and effectively Gaussian.

There are several advantages of this technology:

Reduced overhead: Stochastic multiplexing of UGS slots requires less overhead signaling than the multi-user packet approach described in the background. It does not need to deliver MCS information along with each packet and does not have packing constraints at the scheduler. Compared to a extended real-time polling approach, the silence period of the voice traffic is naturally suppressed using this technology and the radio resources freed up as a result of reduced interference to other users or other cells because the extended real-time polling still generates a polling signal during a silence period and the UGS based system can completely remove polling.

Low complexity in scheduling: Stochastic multiplexing of UGS slots only requires defining one or more user group and having the scheduler allocate a user signature to each user in the group. Compared with using multi-user packets, it does not require complicated handling of buffered packet delays, packing, and adaptive MCS. In addition, hybrid ARQ (HARQ) is easy to perform in stochastically-multiplexed UGS slots because the retransmission has already been allocated persistently.

Remedy for over-provisioned radio resources: For interactive traffic with medium-to-low activity factors, single-user UGS may lead to over-provisioned resources. In this case, due to stringent delay requirements, data cannot be buffered until there is enough data for the highest provisioned rate. Low-rate data or idle periods leaves radio resources unused. Multiplexed UGS adapts naturally to the activity factor of the available data because the aggregated data rate of a multiplexed UGS slot will likely be the average rate for the given type of traffic. UGS rate fluctuations around the average and an occasional overload can be accepted as long as any overloading is controlled below a given threshold amount.

Spontaneous: No bandwidth-request indicator-poll-request-grant mechanism is needed as is the case for extended real-time polling approaches.

Efficient power and interference control: The direct sequence spreading, the tone hopping, or a hybrid multiple-access scheme remains orthogonal under most channel conditions. When applying power control in coherent block with guaranteed orthogonality among users, the multiplexed UGS slot has better transient behavior than conventional CDMA in power fluctuation because the orthogonality prevents users from competing for power to meet the minimum SNR requirement at the receiver. This multiple-access orthogonality avoids power control instability and power battles among users, i.e., users competing to raise their power levels to counteract rising interferences. Power control also provides low-interference, frequency-time blocks to adjacent cells, creating opportunistic gain for users in the soft handover zones.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the pubic regardless of whether the embodiment, feature, component, or step is recited in the claims.

The invention claimed is:

1. A method for radio communications in a packet-based communications system, comprising:
in response to radio resource requests associated with specific user devices, dynamically scheduling radio resources to permit communications between ones of the specific user devices and the packet-based communications system, where the scheduled communications associated with each of the user devices in the packet-based communications system are designed not to use the same radio resource at the same time;
establishing an unsolicited grant of radio resources for communication of user data content between multiple user devices and the packet-based communications system, where the communication of user data content between multiple user devices and the packet-based communications system uses at least some of the same radio resources associated with the unsolicited grant at the same time and where the user data content is different from pilot information that may also be communicated between the multiple user devices and the packet-based communications system;
processing each of the multiple user's data content to be transmitted to combine each of the multiple user's data content with a corresponding user-specific radio resource pattern that is also different from pilot information such that one user's corresponding radio resource pattern is useable by a radio receiver to extract that one user's data content from the multiple user transmissions received using the same unsolicited grant of radio resources at the same time; and
transmitting the processed data for each of the multiple user devices using the same unsolicited grant of radio resources at the same time.

2. The method in claim 1, wherein the allocated unsolicited grant of radio resources includes frequency and/or time resources.

3. The method in claim 1, wherein the packet-based communications system employs orthogonal frequency division multiple access (OFDMA) and the allocated unsolicited grant of radio resources includes frequency and time resources.

4. The method in claim 3, wherein the packet-based communications system is designed so that transmissions associated with specific user devices normally do not collide or overlap.

5. The method in claim 3, wherein the packet-based communications system is an LTE-based system, a WiMAX-based system, or an OFDMA-based system.

6. The method in claim 1, wherein each user-specific radio resource pattern corresponds to a different spreading code and the different spreading codes associated with each user are substantially orthogonal to each other.

7. The method in claim 1, wherein each user-specific radio resource pattern corresponds to a set of orthogonal channelization codes, and wherein applying the corresponding set of orthogonal channelization codes to each user's data contents results in Guassian-like interference to the other users.

8. The method in claim 1, wherein each user-specific radio resource pattern corresponds to a different frequency-time pattern.

9. The method in claim 1, wherein each user-specific radio resource pattern corresponds to a different frequency-time hopping pattern.

10. The method in claim 1, wherein the unsolicited grant of radio resources for communication between multiple user devices and the packet-based communications system is established for an unsolicited grant service (UGS) used for data content communications that include one or more of the following characteristics: non-deterministic activity factor, delay-sensitive, lower data rate requirements, or tolerance to bit or block errors, and
   where the UGS gives the multiple user devices access to radio resources without an explicit request from each of the multiple user devices for each transmission using the UGS radio resources.

11. The method in claim 10, wherein the data content includes voice packets.

12. The method in claim 11, wherein the UGS radio resource grant includes a UGS time slot, and wherein communications involving multiple user devices are sent during the same UGS time slot.

13. The method in claim 12, further comprising:
   allocating a number of the multiple user devices in the same UGS time slot as a function of interference.

14. The method in claim 12, wherein after the UGS slot is allocated, where the UGS slot provides a total data rate associated with the multiple user device's data content transmissions, the method includes multiplexing the processed data content for the multiple user devices onto the UGS slot at the same time so that the multiple user device data content shares access to the UGS slot in a stochastic fashion.

15. The method in claim 14, wherein the data content includes voice information and the UGS slot is used by each of the multiple user devices based on a voice activity factor associated with each of the multiple user devices.

16. The method in claim 11, further comprising:
   designating a first set of user devices to use the radio resources allocated for the UGS slot in a non-overlapping manner, and
   designating a second set of one or more user devices users to use the radio resources allocated for the UGS slot in a manner that at least partially overlaps the scheduled use by the first set of user devices.

17. The method in claim 16, further comprising:
   controlling an amount of interference caused by partial overlap of the second set of one or more user devices experienced by each of the first set of user devices.

18. The method in claim 16, wherein the user-specific radio resource patterns are selected to make mutual interference between the first and second sets of user devices approximately Gaussian after receiver processing.

19. A radio network node for conducting radio communications in a packet-based communications system, comprising:
   a scheduler configured, in response to radio resource requests associated with specific user devices, to dynamically schedule radio resources to permit communications between ones of the specific user devices and the packet-based communications system, where the scheduled communications associated with each of the user devices in the packet-based communications system are designed not to use the same radio resource at the same time;
   the scheduler being further configured to establish an unsolicited grant of radio resources for communication of user data content between multiple user devices and the packet-based communications system, where the communication of user data content between multiple user devices and the packet-based communications system uses at least some of the same radio resources associated with the unsolicited grant at the same time and where the user data content is different from pilot information that may also be communicated between the multiple user devices and the packet-based communications system;
   a signal processor configured to process each of the multiple user's data content with a corresponding user-specific radio resource pattern that is different from pilot information useable by a radio receiver to extract an individual one of the multiple user's data content from the multiple user transmissions received using the same unsolicited grant of radio resources at the same time; and
   a transmitter for transmitting the processed data transmitting for each of the multiple user devices using the same unsolicited grant of radio resources at the same time.

20. The radio network node in claim 19, wherein the processing includes combining each of the multiple user's data content with its corresponding user-specific radio resource pattern.

21. The radio network node in claim 19, wherein the packet-based communications system employs orthogonal frequency division multiple access (OFDMA) and the allocated unsolicited grant of radio resources includes frequency and time resources.

22. The radio network node in claim 21, wherein the packet-based communications system is designed so that transmissions associated with specific user devices normally do not collide or overlap.

23. The radio network node in claim 21, wherein the packet-based communications system is an LTE-based system, a WiMAX-based system, or an OFDMA-based system.

24. The radio network node in claim 19, wherein each user-specific, radio resource pattern corresponds to a different spreading code and the different spreading codes are substantially orthogonal to each other.

25. The radio network node in claim 19, wherein each user-specific radio resource pattern corresponds to a set of orthogonal channelization codes, and wherein application of the corresponding set of orthogonal channelization codes to each user's data content results in Guassian-like interference to the other users.

26. The radio network node in claim 19, wherein each user-specific radio resource pattern corresponds to a different frequency-time pattern.

27. The radio network node in claim 19, wherein each user-specific radio resource pattern corresponds to a different frequency-time hopping pattern.

28. The radio network node in claim 19, wherein the scheduler is further configured to establish unsolicited grant of radio resources for communication between multiple user devices and the packet-based communications system for an unsolicited grant service (UGS) used for data content that include one or more of the following characteristics: a non-deterministic activity factor, delay-sensitive, lower data rate requirements, or tolerance to bit or block errors, and
   where the UGS gives the multiple user devices access to radio resources without an explicit request from each of the multiple user devices for each transmission using the UGS radio resources.

29. The radio network node in claim 28, wherein the data content includes voice packets.

30. The radio network node in claim 29, wherein the UGS radio resource grant includes a UGS time slot, and wherein communications involving multiple user devices are sent during the same UGS time slot.

31. The radio network node in claim 30, wherein the scheduler is configured to allocate a number of the multiple user devices in the same UGS time slot as a function of interference.

32. The radio network node in claim 30, wherein after the UGS slot is allocated, the UGS slot provides a bandwidth larger a total data rate associated with the multiple user device's data content transmissions, and wherein the scheduler is further configured to multiplex the processed data content for the multiple user devices onto the UGS slot at the same time so that the multiple user device data content shares access to the UGS slot in a stochastic fashion.

33. The radio network node in claim 32, wherein the data content includes voice information and the UGS slot is useable by each of the multiple user devices based on a voice activity factor associated with each of the multiple user devices.

34. The radio network node in claim 29, wherein the scheduler is further configured to:
  designate a first set of user devices to use the radio resources allocated for the UGS slot in a non-overlapping manner, and
  designate a second set of one or more user devices users to use the radio resources allocated for the UGS slot in a manner that at least partially overlaps the scheduled use by the first set of user devices.

35. The radio network node in claim 34, wherein the signal processor is further configured to control an amount of interference caused by partial overlap of the second set of one or more user devices experienced by each of the first set of user devices.

36. The radio network node in claim 34, wherein the user-specific signatures are configured to make mutual interference between the first and second sets of user devices approximately Gaussian after receiver processing.

* * * * *

UNITED STATES PATENT AND TRADEMARK OFFICE
CERTIFICATE OF CORRECTION

PATENT NO. : 8,717,979 B2  
APPLICATION NO. : 12/053323  
DATED : May 6, 2014  
INVENTOR(S) : Tsai et al.

Page 1 of 2

It is certified that error appears in the above-identified patent and that said Letters Patent is hereby corrected as shown below:

In the Drawings

In Fig. 6, Sheet 5 of 6, delete "overlaping data" and insert -- overlapping data --, therefor.

In the Specification

In Column 4, Line 33, delete "Guassian-like" and insert -- Gaussian-like --, therefor.

In Column 5, Line 67, delete "L-UTRAN 12" and insert -- E-UTRAN 12 --, therefor.

In Column 6, Line 31, delete "WE 20" and insert -- UE 20 --, therefor.

In Column 8, Line 18, delete "LOS" and insert -- UGS --, therefor.

In Column 8, Line 45, delete "user-specific user-specific" and insert -- user-specific --, therefor.

In Column 9, Line 24, delete "air interface 56" and insert -- air interface --, therefor.

In Column 9, Lines 28-29, delete "resource manager 46. The transceiver 46" and insert -- resource manager 48. The transceiver 56 --, therefor.

In Column 9, Line 51, delete "USG" and insert -- UGS --, therefor.

In Column 11, Line 65, delete "pubic" and insert -- public --, therefor.

Signed and Sealed this  
Twentieth Day of January, 2015

Michelle K. Lee  
*Deputy Director of the United States Patent and Trademark Office*

In the Claims

In Column 12, Line 57, in Claim 7, delete "Guassian-like" and insert -- Gaussian-like --, therefor.

In Column 14, Line 28, in Claim 24, delete "user-specific," and insert -- user-specific --, therefor.

In Column 14, Line 35, in Claim 25, delete "Guassian-like" and insert -- Gaussian-like --, therefor.